(No Model.)
E. BRUSH.
THILL COUPLING.
No. 579,290. Patented Mar. 23, 1897.
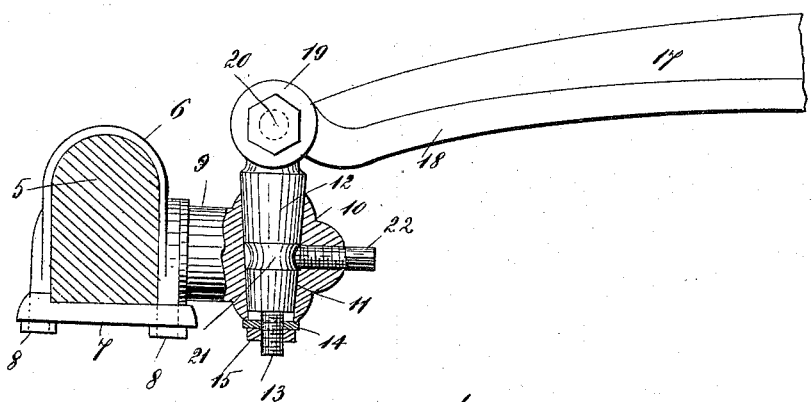
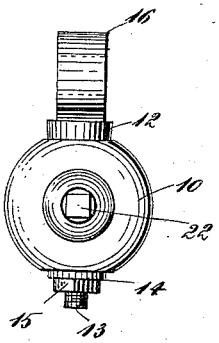
WITNESSES
John Buckler,
C Gerst
INVENTOR
Egbert Brush.
BY
Edgar Tate & Co
ATTORNEYS.

UNITED STATES PATENT OFFICE.

EGBERT BRUSH, OF SMITHTOWN BRANCH, NEW YORK.

THILL-COUPLING.

SPECIFICATION forming part of Letters Patent No. 579,290, dated March 23, 1897.

Application filed July 8, 1896. Serial No. 598,401. (No model.)

*To all whom it may concern:*

Be it known that I, EGBERT BRUSH, a citizen of the United States, and a resident of Smithtown Branch, in the county of Suffolk and State of New York, have invented certain new and useful Improvements in Thill-Couplings, of which the following is a specification, reference being had to the accompanying drawings, forming a part thereof, in which similar numerals of reference indicate corresponding parts wherever found throughout both views.

This invention relates to thill-couplings; and the object thereof is to provide an improved coupling of this class for securing the shafts of a vehicle thereto, a further object being to provide a thill-coupling which is so constructed and arranged that the shafts may be laterally turned on their supports.

The invention is fully disclosed in the following specification, of which the accompanying drawings form a part, in which—

Figure 1 is a sectional side view of my improved coupling, showing also the axle of a vehicle; and Fig. 2, a front view of the coupling.

In the drawings forming part of this specification I have shown at 5 the axle of a vehicle, and in the practice of my invention I provide a clip 6, which is connected therewith by a cross-bar 7, and held in place by nuts or burs 8. The clip 6 is provided at one side with a forwardly-directed extension or projection 9, the outer end of which is provided with a head 10, circular in vertical transverse section, and in which is formed a central vertical bore or passage 11, slightly conical in form, and the larger end of which is directed upwardly. Mounted therein is a thill-plug 12, which is also slightly conical in form, and which is provided at its lower end with a screw-threaded extension 13, on which is placed a washer 14 and a nut or bur 15. This thill-plug 12 is provided at its upper end with a circular head 16, which is flat on both sides, as shown in Fig. 2, and in practice the shaft 17 is provided with a metal arm 18, which is provided with two circular heads 19, but one of which is shown, and in connecting the shaft with the thill-plug the head 16 of said plug is placed between the heads 19 of the arm 18, and the bolt 20 is passed therethrough. The thill-plug is also provided centrally with an annular groove 21, and I also provide a set-screw 22, which passes through the outer side of the head 10 and into said annular groove, and by means of this arrangement the thill-plug will be securely held in place at all times and will also be free to revolve in the head 10.

The thill-plug may be tightened whenever desired either by the nut or bur 15 or by the set-screw 22, and it will be apparent that by means of this construction the shaft 17 may be turned laterally whenever desired, and it will also be understood that the connection of the shaft with the thill-plug is a pivotal connection and said shaft may be raised or lowered in the usual manner.

Having fully described my invention, I claim as new and desire to secure by Letters Patent—

1. The herein-described thill-coupling, which consists of a clip, which is adapted to be connected with the axle of the vehicle, said clip being provided with an outwardly-directed extension or shoulder which is formed integrally therewith, or rigidly secured thereto, and in which is formed a vertical bore or passage, said bore or passage being provided with a thill-plug which passes therethrough, and which is adapted to be held therein, and also to revolve therein, said thill-plug being provided at its upper end with a head having a central transverse bore or passage whereby a shaft may be connected therewith, substantially as shown and described.

2. The combination with an axle of a vehicle, of a clip adapted to be secured thereon, and provided with an extension 9, having a head in which is formed a vertical bore, of a conical plug adapted to be secured in said bore and having a screw-threaded extension, adapted to project below said head and to receive a bur to retain the same within the bore of the head, said plug being also provided with an annular groove adapted to receive a set-screw secured in said head, and said plug having a head or enlargement provided with an opening by means of which attachment is made with the shaft by a bolt or pin, substantially as shown.

In testimony that I claim the foregoing as my invention I have signed my name, in presence of the subscribing witnesses, this 7th day of July, 1896.

EGBERT BRUSH.

Witnesses:
W. W. HILL,
CHARLES S. ROGERS.